(12) United States Patent
Gentile et al.

(10) Patent No.: US 11,645,464 B2
(45) Date of Patent: May 9, 2023

(54) TRANSFORMING A LEXICON THAT DESCRIBES AN INFORMATION ASSET

(71) Applicant: International Business Machines Corporation, Armonk, NY (US)

(72) Inventors: Anna Lisa Gentile, San Jose, CA (US); Chad Eric DeLuca, Morgan Hill, CA (US); Petar Ristoski, San Jose, CA (US); Ismini Lourentzou, San Jose, CA (US); Linda Ha Kato, San Jose, CA (US); Alfredo Alba, Morgan Hill, CA (US); Daniel Gruhl, San Jose, CA (US); Steven R. Welch, Gilroy, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 17/205,755

(22) Filed: Mar. 18, 2021

(65) Prior Publication Data

US 2022/0300709 A1    Sep. 22, 2022

(51) Int. Cl.
*G10L 15/00*    (2013.01)
*G06F 40/284*    (2020.01)
(Continued)

(52) U.S. Cl.
CPC .......... *G06F 40/284* (2020.01); *G06F 16/334* (2019.01); *G06F 40/151* (2020.01); *G06N 3/042* (2023.01)

(58) Field of Classification Search
CPC .... G06F 40/284; G06F 16/334; G06F 40/151; G06N 3/0427; G10L 15/22
See application file for complete search history.

(56) References Cited

U.S. PATENT DOCUMENTS

| 7,689,536 B1 | 3/2010 | Weissman et al. |
| 7,877,343 B2 | 1/2011 | Cafarella et al. |

(Continued)

OTHER PUBLICATIONS

F. J. Rinaldo, R. E. Strutz and M. W. Evens, "Developing a lexicon for automatic knowledge acquisition," Proceedings of International Conference on Expert Systems for Development, 1994, pp. 74-78, doi: 10.1109/ICESD.1994.302303. (Year: 1994).*

(Continued)

*Primary Examiner* — Bhavesh M Mehta
*Assistant Examiner* — Uthej Kunamneni
(74) *Attorney, Agent, or Firm* — Amin, Turocy & Watson, LLP

(57) ABSTRACT

Systems, computer-implemented methods, and computer program products to transform a lexicon that describes an information asset are provided. According to an embodiment, a system can comprise a memory that stores computer executable components and a processor that executes the computer executable components stored in the memory. The computer executable components can comprise a term validation component that can determine from a subject matter expert, a validated term that can indicate validation of a candidate term that describes an information asset. The computer executable components can further comprise a lexicon transforming component that, based on the validated term, can transform a lexicon that describes the information asset, by incorporating the validated term into the lexicon.

20 Claims, 10 Drawing Sheets

(51) Int. Cl.
*G06F 16/33* (2019.01)
*G06F 40/151* (2020.01)
*G06N 3/042* (2023.01)

(56) References Cited

U.S. PATENT DOCUMENTS

| | | | |
|---|---|---|---|
| 8,417,709 | B2 | 4/2013 | Chiticariu et al. |
| 9,299,031 | B2 | 3/2016 | Jan et al. |
| 9,613,004 | B2 | 4/2017 | Liang et al. |
| 2010/0299334 | A1* | 11/2010 | Waite ............... G06Q 10/10 707/811 |
| 2011/0191276 | A1 | 8/2011 | Cafarella et al. |
| 2014/0032209 | A1 | 1/2014 | Etzioni et al. |
| 2016/0162458 | A1 | 6/2016 | Munro et al. |
| 2016/0162464 | A1 | 6/2016 | Munro et al. |
| 2016/0162786 | A1 | 6/2016 | Grudic et al. |
| 2016/0323243 | A1* | 11/2016 | LeVasseur ............ G06F 21/64 |
| 2018/0032497 | A1* | 2/2018 | Mukherjee ........... G06F 40/253 |

OTHER PUBLICATIONS

Alba et al. "Multi-lingual Concept Extraction with Linked Data and Human-in-the-Loop" K-CAP 2017, Dec. 4-6, 2017, Austin, 8 pages.
Collet et al. "Machine Learning: Making Sense of Unstructured Data and Automation in Alt Investments" Traders Magazine, Apr. 8, 2020, 3 pages.
"Can you combine the power of human and machine through robotics and intelligent automation?" Ernst & Young LLP, 2018 32 pages.
Gronsund et al. "Augmenting the algorithm: Emerging human-in-the-loop work configurations" Journal of Strategic Information Systems 29 (2020) 101614, 16 pages.
Guerci "The Role of Humans in Document-Driven RPA Applications" Machine Learning, Mar. 12, 2020, https://www.ocrolus.com/the-role-of-humans-in-rpa-applications/, Last Accessed Dec. 21, 2020, 7 pages.
Guo et al. "A Survey on Knowledge Graph-Based Recommender Systems" arXiv:2003.00911v1 [cs.IR] Feb. 28, 2020, 17 pages.
Axelrod et al. "Domain Adaptation via PseudoIn-Domain Data Selection" ACM, Jul. 2011, https://www.microsoft.com/en-us/research/wp-content/uploads/2016/02/emnlp11-select-train-data.pdf, 8 pages.
Downey et al. "Sparse Information Extraction: Unsupervised Language Models to the Rescue" Proceedings of the 15th Annual Meeting of the Association of Computational Linguistics, pp. 696-703, 8 pages.
Singh et al. "Minimally-supervised extraction of entities from text advertisements." Human Language Technologies: The 2010 Annual Conference of the North American Chapter of the Association for Computational Linguistics. 2010. https://www.aclweb.org/anthology/N10-1009.pdf, 9 pages.
Etzioni et al. "Open information extraction from the web." Communications of the ACM 51.12 (2008): 68-74. https://dl.acm.org/doi/fullHtml/10.1145/1409360.1409378, 7 pages.
Niklaus et al. "A Survey on Open Information,Extraction" arXiv:1806.05599v1 [cs.CL] Jun. 14, 2018, 13 pages.
Zhang et al. "Few-Shot Knowledge Graph Completion" arXiv:1911.11298v1 [cs.CL] Nov. 26, 2019, 9 pages.
Wang et al. "A Framework Using Active Learning to Rapidly Perform Named Entity Extraction and Relation Recognition for Science and Technology Knowledge Graph" Open Journal of Social Sciences, 2020, 8, 315-325, 11 pages.
Mel, et al., "The NIST Definition of Cloud Computing," Special Publication 800-145, Sep. 2011, 7 pages.

\* cited by examiner

TRANSFORMING A LEXICON THAT DESCRIBES AN INFORMATION ASSET

TECHNICAL FIELD

The embodiments described herein relate to information processing, and more specifically, to management of information assets.

SUMMARY

The following presents a summary to provide a basic understanding of one or more embodiments of the invention. This summary is not intended to identify key or critical elements, nor delineate any scope of the particular embodiments or any scope of the claims. Its sole purpose is to present concepts in a simplified form as a prelude to the more detailed description that is presented later. In one or more embodiments described herein, systems, devices, computer-implemented methods, and computer program products that transform a lexicon that describes an information asset are described.

As discussed further below, in accordance with one or more embodiments described herein, an expert can be utilized by embodiments in different circumstances, e.g., a subject matter expert. It is important to note that, when utilized by some embodiments described herein, a subject matter expert can refer to an electrical or mechanical component that can be implemented in hardware, software, a repository, artificial intelligence or machine learning device, repository, or other type of entity for providing the functions described. For example, according to an embodiment, a system can comprise a memory that stores computer executable components and a processor that executes the computer executable components stored in the memory. The computer-executable components can comprise a term validation component that can determine from a subject matter expert, a validated term that can indicate validation of a candidate term that describes an information asset. The computer executable components can further comprise a lexicon transforming component that, based on the validated term, can transform a lexicon that describes the information asset, by incorporating the validated term into the lexicon.

In some implementations, the above-noted system can further comprise a query augmenting component that can augment a query of a knowledge base of information assets, by employing the validated term of the lexicon. In additional or alternative implementations, the computer-executable components can further comprise an expert selecting component that, based on the information asset, can select the subject matter expert. An approach to selecting the subject matter expert based on the information asset comprises selecting the subject matter expert based on a relationship between the subject matter expert and the information asset, e.g., the subject matter expert can be an owner of the information asset. In some implementations, selecting the subject matter expert based on the information asset can include determining that the subject matter expert has expertise regarding the information asset that exceeds a threshold and selecting the subject matter expert based on the expertise.

In additional or alternative implementations, the computer-executable components can further comprise a term submitting component that can submit the candidate term to the subject matter expert that can validate the candidate term. In additional or alternative implementations, the computer-executable components can further comprise a configuration component that can configure a neural network that can analyze information assets by employing the validated term of the lexicon.

In additional or alternative implementations, the computer executable components can further include a keyword identifying component that can identify, by employing distributional semantics, a salient keyword describing the information asset based on an analysis of textual content describing the information asset. Additionally, in a variation, the computer executable components can further include a candidate term selecting component that can select the salient keyword as the candidate term.

According to another embodiment, a computer-implemented method can comprise determining from a subject matter expert a validated term that indicates validation of a candidate term that describes an information asset. The computer-implemented method can further include operations to, based on the validated term, transform a lexicon that describes the information asset by incorporating the validated term into the lexicon. The computer-implemented method can further include operations to augment, by the device, a query of a knowledge base of information assets by employing the validated term of the lexicon.

The computer-implemented method can further include operations to, based on the information asset, select, by the device, the subject matter expert. The computer-implemented method can further include operations to submit, by the device, the candidate term to the subject matter expert that validates the candidate term. In some implementations, the selecting the subject matter expert can be based on factors including, but not limited to: characteristics of the subject matter expert, a relationship between the subject matter expert and the information asset, e.g., the subject matter expert can be an entity that owns, manages, controls, describes, monitors, or is otherwise related to, the information asset.

In additional or alternative embodiments, the computer-implemented method can further comprise selecting the subject matter expert based on the information asset. For example, a subject matter expert can be selected because of access to information about the asset that exceeds a threshold. In alternative or additional embodiments, the computer-implemented method can further include configuring, by the device, a neural network that can analyze information assets by employing the validated term of the lexicon. In additional or alternative embodiments, the computer-implemented method can further comprise identifying, by the device employing distributional semantics, a salient keyword describing the information asset based on an analysis of textual content describing the information asset, and selecting, by the device, the salient keyword as the candidate term.

According to another embodiment, a computer program product that can transform a lexicon that describes an information asset is provided. The computer program product can comprise a computer readable storage medium having program instructions embodied therewith, the program instructions executable by a processor to cause the processor to determine from a subject matter expert, a validated term that indicates validation of a candidate term that describes the information asset, and based on the validated term, transform the lexicon.

In some embodiments, the program instructions are further executable by the processor to cause the processor to augment a query of a knowledge base of information assets by employing the validated term of the lexicon. Further, the program instructions can be further executable to cause the processor to, based on the information asset, select the subject matter expert, and submit the candidate term to the subject matter expert that validates the candidate term. In additional or alternative embodiments, the program instructions are further executable by the processor to cause the processor to select the subject matter expert based on the information asset by selecting the subject matter expert based on a relationship between the subject matter expert and the information asset.

In additional embodiments, the program instructions are further executable by the processor to cause the processor to select the subject matter expert based on the information asset can include determining that the subject matter expert has expertise regarding the information asset that exceeds a threshold, and the subject matter expert can be selected based on the expertise. In additional embodiments, the program instructions are further executable by the processor to cause the processor to configure, by the device, a neural network that can analyze information assets by employing the validated term of the lexicon. In additional embodiments, the program instructions are further executable by the processor to cause the processor to identify, by the device employing distributional semantics, a salient keyword describing the information asset based on an analysis of textual content describing the information asset, and selecting, by the device, the salient keyword as the candidate term.

Other embodiments may become apparent from the following detailed description when taken in conjunction with the drawings.

DETAILED DESCRIPTION

The following detailed description is merely illustrative and is not intended to limit embodiments and application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As referenced herein, an entity can comprise a human, a client, a user, a computing device, a software application, an agent, a machine learning model, an artificial intelligence, and another entity. It should be appreciated that such an entity can implement one or more of the embodiments described herein. An example entity described by one or more embodiments described here is a subject-matter expert validator, also termed a subject-matter expert, an expert, or an expert validator.

Figure 1:
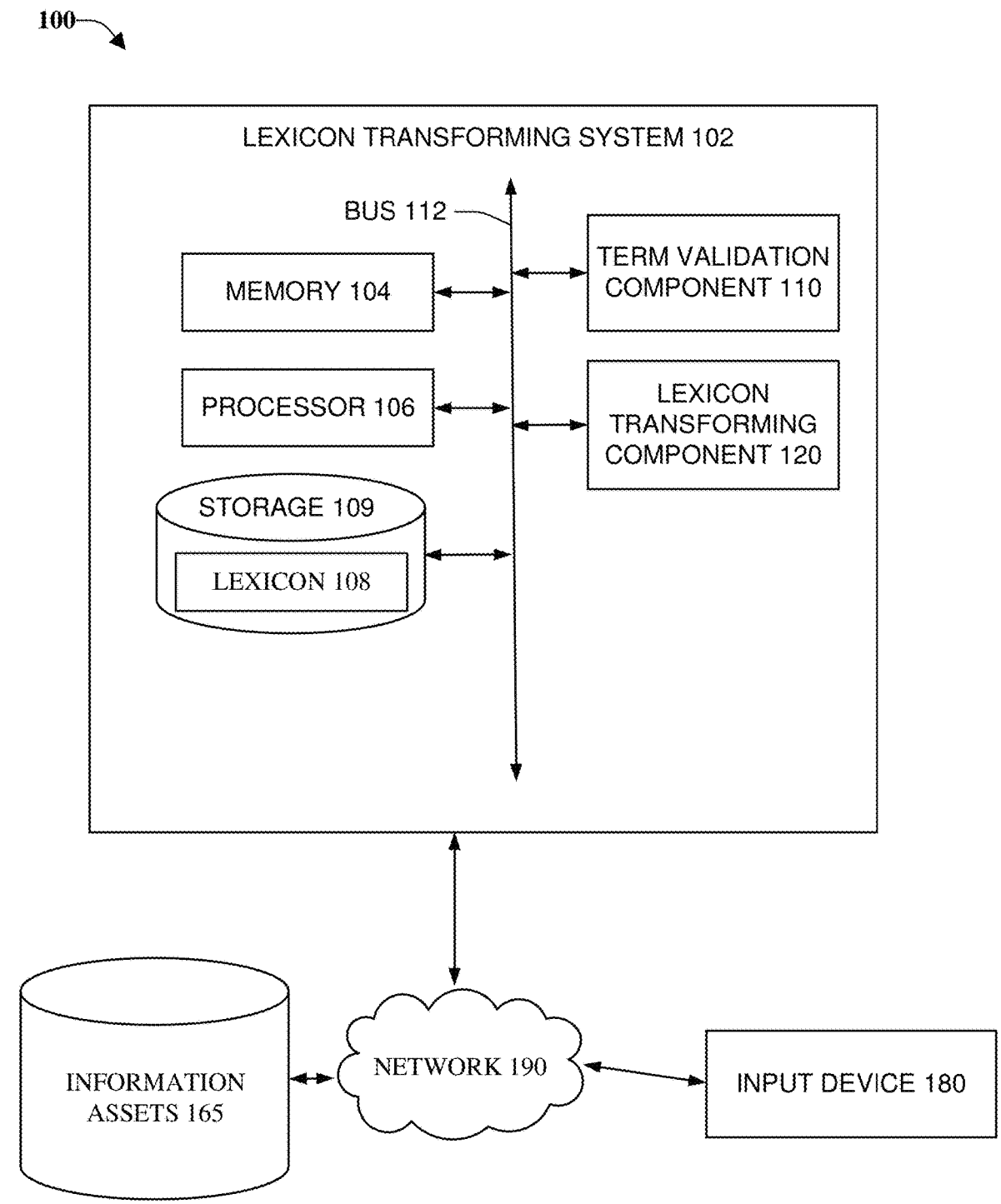
FIG. 1 illustrates a block diagram of an example, non-limiting system that can transform a lexicon that describes an information asset, in accordance with one or more embodiments described herein.

FIG. 1 illustrates a block diagram of an example, non-limiting system 100 that can transform a lexicon that describes an information asset, in accordance with one or more embodiments described herein. Repetitive description of like elements and processes employed in respective embodiments is omitted for sake of brevity.

In one or more embodiments, information assets 165 can broadly include a variety of internal assets of an organization, e.g., and asset that the organization owns, produces, offers to clients, etc. An organization information asset can also be any artifact or intellectual property owned by the organization. As described in one or more embodiments, an under-defined target entity refers to an information asset where a knowledge base that describes the information asset is determined to require additional information for some use of the information asset.

As would be appreciated by one having skill in the relevant art(s), given the description herein, one or more embodiments can identify information about an under-defined target entity in available, potentially informal text. In some examples, when an information asset is in a rapidly evolving technical area, the vocabulary used to describe the asset can be in flux, e.g., terms to describe the information asset can be adopted and discarded relatively quickly compared to more established technical areas.

As described further herein, one or more embodiments can supplement and update terms that describe an information asset by maintaining lexicon 108 with terms that describe information asset 165. Some approaches described herein can manage lexicon 108 by selecting candidate terms for use in transforming lexicon 108 to better describe current aspects of information asset 165. Once selected, candidate terms can be validated for use in a variety of ways, including the use of selected outside knowledge from subject matter experts, e.g., received via input device 180.

In one or more embodiments, memory 104 can store one or more computer and machine readable, writable, and executable components and instructions that, when executed by processor 106 (e.g., a classical processor, a quantum processor, etc.), can perform operations defined by the executable components and instructions. For example, memory 104 can store computer and machine readable, writable, and executable components and instructions that, when executed by processor 106, can execute the various functions described herein relating to lexicon transforming system 102, lexicon transforming component 120, term validation component 110, and another components associated with lexicon transforming systems as described herein with or without reference to the various figures of the one or more embodiments described herein.

Memory 104 can comprise volatile memory (e.g., random access memory (RAM), static RAM (SRAM), dynamic RAM (DRAM), etc.) and non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any of the embodiments described herein.

Processor 106 can comprise one or more types of processors and electronic circuitry (e.g., a classical processor, a quantum processor, etc.) that can implement one or more computer and machine readable, writable, and executable components and instructions that can be stored on memory 104. For example, processor 106 can perform various operations that can be specified by such computer and machine readable, writable, and executable components and instructions including, but not limited to, logic, control, input/output (I/O), arithmetic, and the like. In some embodiments, processor 106 can comprise one or more central processing unit, multi-core processor, microprocessor, dual microprocessors, microcontroller, System on a Chip (SOC), array processor, vector processor, quantum processor, and another type of processor. Further examples of processor 106 are described below with reference to processing unit 814 and FIG. 8. Such examples of processor 106 can be employed to implement any embodiments described herein.

As depicted, example 100 can include lexicon transforming system 102 coupled to information assets 165 and input device 180, via network 190. It should be noted that, when an element is referred to herein as being "coupled" to another element, it can describe one or more different types of coupling. For example, when an element is referred to herein as being "coupled" to another element, it can be described one or more different types of coupling including, but not limited to, chemical coupling, communicative coupling, capacitive coupling, electrical coupling, electromagnetic coupling, inductive coupling, operative coupling, optical coupling, physical coupling, thermal coupling, and another type of coupling.

In one or more embodiments, lexicon transforming system 102 can include term validation component 110, lexicon transforming component 120, memory 104, processor 106, storage 109, and any other components that can be used to enable different functions described herein. It should be appreciated that the embodiments described herein depict in various figures disclosed herein are for illustration only, and as such, the architecture of such embodiments are not limited to the systems, devices, and components depicted therein. For example, in some embodiments, system 100 and lexicon transforming system 102 can further comprise various computer and computing-based elements described herein with reference to operating environment 800 and FIG. 8. In several embodiments, such computer and computing-based elements can be used in connection with implementing one or more of the systems, devices, components, and computer-implemented operations shown and described in connection with FIG. 1 and other figures disclosed herein.

Lexicon transforming system 102, memory 104, processor 106, lexicon transforming component 120, term validation component 110, and any other component of lexicon transforming system 102 as described herein, can be communicatively, electrically, operatively, and optically coupled to one another via a bus 112 to perform functions of system 100, lexicon transforming system 102, and any components coupled therewith. Bus 112 can comprise one or more memory bus, memory controller, peripheral bus, external bus, local bus, a quantum bus, and another type of bus that can employ various bus architectures. Further examples of bus 112 are described below with reference to system bus 818 and FIG. 8. Such examples of bus 112 can be employed to implement any of the embodiments described herein.

Lexicon transforming system 102 can comprise any type of component, machine, device, facility, apparatus, and instrument that comprises a processor and can be capable of effective and operative communication with a wired and wireless network. All such embodiments are envisioned. For example, lexicon transforming system 102 can comprise a server device, a computing device, a general-purpose computer, a special-purpose computer, a quantum computing device (e.g., a quantum computer), a tablet computing device, a handheld device, a server class computing machine and database, a laptop computer, a notebook computer, a desktop computer, a cell phone, a smart phone, a consumer appliance and instrumentation, an industrial and commercial device, a digital assistant, a multimedia Internet enabled phone, a multimedia players, and another type of device.

In some embodiments, lexicon transforming system 102 can be coupled (e.g., communicatively, electrically, operatively, optically, etc.) to one or more external systems, sources, and devices (e.g., classical and quantum computing devices, communication devices, etc.) via network 190. In some embodiments, network 190 can comprise wired and wireless networks, including, but not limited to, a cellular network, a wide area network (WAN) (e.g., the Internet) or a local area network (LAN). For example, lexicon transforming system 102 can communicate with one or more external systems, sources, and devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and other proprietary and non-proprietary communication protocols. In such an example, lexicon transforming system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that communicates information between lexicon transforming system 102 and external systems, sources, and devices (e.g., computing devices, communication devices, etc.).

In one or more embodiments described herein, lexicon transforming system 102 can perform (e.g., via processor 106) operations including, but not limited to, lexical expansion, pattern identification, term extraction, term validation, micro-adjudication, and lexicon transformation, executed by and associated with one or more components, e.g., lexicon transforming component 120, and term validation component 110. For example, term validation component 110 can determine (e.g., via processor 106), from a subject matter expert, a validated term that can indicate validation of a candidate term that describes an information asset. In some embodiments, term validation component 110 can facilitate such, performing the following: identifying a candidate term for validation, selecting an expert validator for validation, communicating the candidate term to a selected expert validator for validation. Such will be discussed in greater detail with reference to FIG. 2 and the accompanying text.

The computer executable components of lexicon transforming system 102 can further comprise a lexicon transforming component 120 that, based on the validated term, can transform a lexicon 108 that describes the information asset 165, by incorporating the validated term into the lexicon. In some embodiments, lexicon transforming component 120 can perform (e.g., via processor 106) operations including, but not limited to: ontology selection, ontology alignment, and lexicon transformation. Such will be discussed in greater detail with reference to FIG. 4 and the accompanying text.

Additional details regarding some implementations that can use subject matter experts to validate candidate terms are provided with FIG. 2 below. Selecting and utilizing subject-matter expert validators by one or more embodiments, is described with FIG. 3, below. Selecting candidate terms and utilizing one or more embodiments to augment queries are discussed with FIG. 5 below, and utilizing different artificial intelligence approaches to transform lexicon 108 is described with FIG. 6 below.

Figure 2:
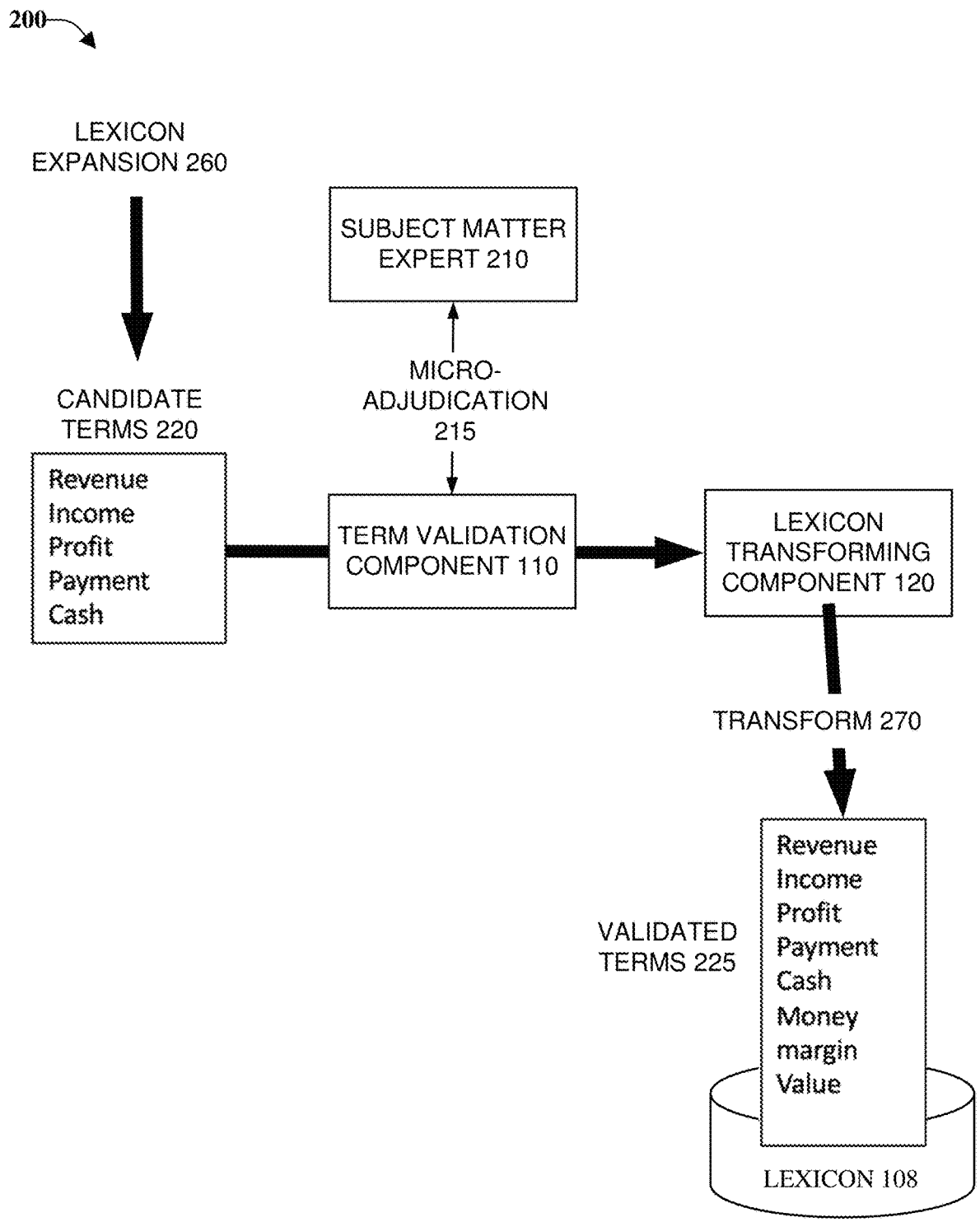
FIG. 2 illustrates a block diagram of an example, non-limiting system that can validate candidate terms for a lexicon that describes an information asset, in accordance with one or more embodiments described herein.

FIG. 2 illustrates a block diagram of an example, non-limiting system 200 that can validate candidate terms for a lexicon that describes an information asset, in accordance with one or more embodiments described herein. Repetitive description of like elements and processes employed in respective embodiments is omitted for sake of brevity.

One approach that can be used by one or more embodiments to identify candidate terms 220 is lexicon expansion 260. In one or more embodiments, candidate terms 220 for validation by term validation component 110 can be identified by lexicon expansion 260 from different sources, including but not limited to, selecting references to be used for term expansion, and analyzing the references for similar terms to be used to add descriptive elements to the word to be expanded. Example references that can be used for expansion include, but are not limited to, pertinent large textual corpora, organization white papers and technical documents (not shown). In the example depicted in FIG. 2, five candidate terms have been identified as expansion terms that can potentially be applied to the analyzed terms, and these expansion terms can further be used to validate other terms for use describing information asset 165.

As depicted and discussed above, term validation component 110 can use different approaches to validate candidate terms 220 and utilize lexicon transforming component 120 to transform 270 lexicon 108, e.g., by adding validated terms 225 to lexicon 108. One approach that can be used by term validation component 110 to validate candidate terms 220 is by utilizing information provided by subject matter experts 210. This use of subject matter experts by embodiments can include, but is not limited to, micro-adjudication 215. In one or more embodiments, adjudication tasks can be submitted to subject matter experts 210 to determine whether respective candidate terms 220 are validated. For example, micro-adjudication 215 tasks can be estimated or limited to last no longer than a relatively short duration, 5 minutes. In some implementations, multiple subject matter experts 210 can be assigned adjudication tasks for the same lexicon at the same time, with adjudications being collated for use by lexicon transforming component 120. With this approach, lexicon 108 can be termed a curated lexicon, e.g., as a dynamic resource referencing information asset 165.

As described further with FIG. 3 below, subject matter experts 210 can be selected using a variety of approaches, including, but not limited to, utilizing organization asset owners of information asset 165.

Figure 3:
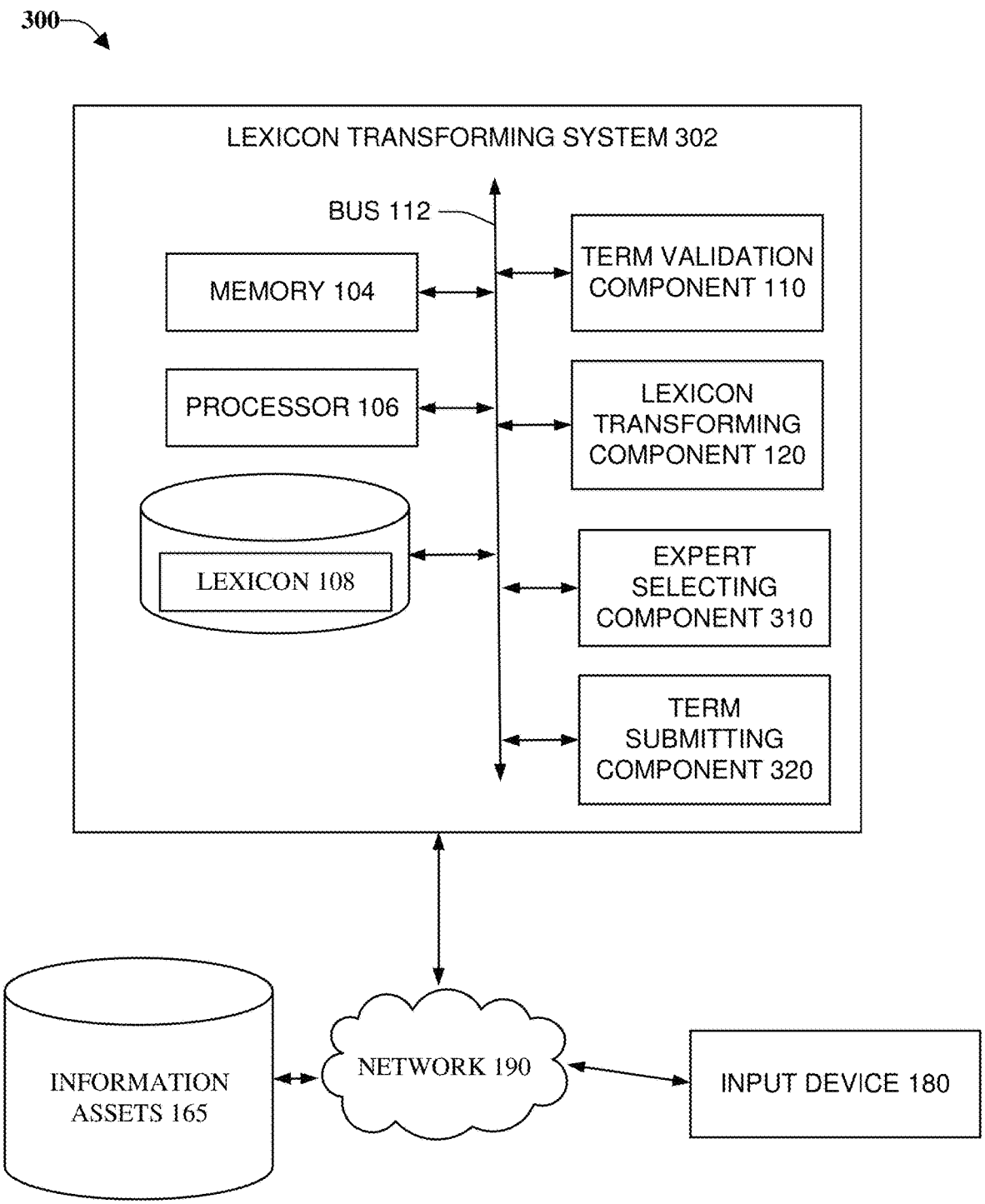
FIG. 3 illustrates a block diagram of an example of non-limiting lexicon transforming system that can transform a lexicon that describes an information asset, in accordance with one or more embodiments described herein.

FIG. 3 illustrates a block diagram of an example 300 of non-limiting lexicon transforming system 302 that can transform a lexicon that describes an information asset, in accordance with one or more embodiments described herein. Repetitive description of like elements and processes employed in respective embodiments is omitted for sake of brevity. As depicted, example 300 can include lexicon transforming system 302 coupled to information assets 165 and input device 180, via network 190. In one or more embodiments, lexicon transforming system 302 can include term validation component 110, lexicon transforming component 120, expert selecting component 310, term submitting component 320, and any other components that can be used to enable different functions described herein.

In lexicon transforming system 302, the computer-executable components can further comprise expert selecting component 310 that, based on information asset 165, can select subject matter expert 210. An approach to selecting subject matter expert 210 based on the information asset can select subject matter expert 210 based on a relationship between subject matter expert 210 and information asset 165, e.g., the subject matter expert can be an owner of the information asset. In some implementations, selecting the subject matter expert based on the information asset can include determining that the subject matter expert has expertise regarding the information asset that exceeds a threshold and selecting the subject matter expert based on the expertise. One approach to selecting subject matter experts can include use of a recommender system, where users can be prompted to identify a certain number of top experts at the organization for information asset 165. Further, in a process that can use micro-adjudication 215, potential experts identified for an information asset can be relayed to the potential subject matter expert, as well as other subject matter experts 210 for assessment, e.g., similar the validation process described above.

In one or more implementations of computer-implemented methods described above, the computer-implemented methods can further include operations to, based on the information asset, select, by the device, the subject matter expert. In some implementations, the selecting the subject matter expert can be based on characteristics of the subject matter expert, based on a relationship between the subject matter expert and the information asset, e.g., the subject matter expert can be an owner of the information asset. For example, one computer-implemented method to select the subject matter expect can include different operations, including, but not limited to, identifying the subject-matter associated with the information asset, generating a query for the expert validator, and communicating the query to the validator. In one or more implementations of the computer program product described above, the program instructions are further executable by the processor to cause the processor to select the subject matter expert based on the information asset by selecting the subject matter expert based on a relationship between the subject matter expert and the information asset.

Figure 4:
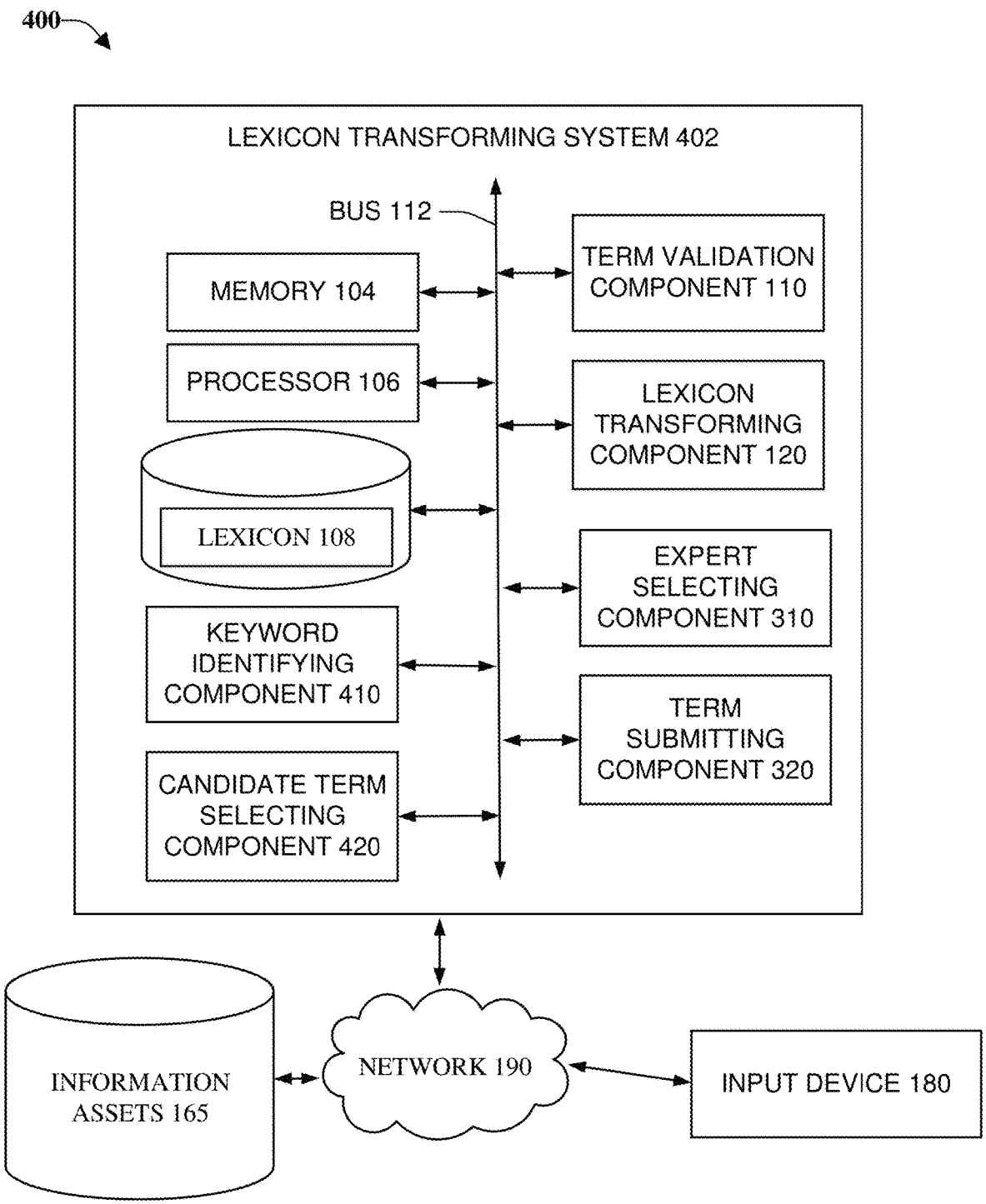
FIG. 4 illustrates a block diagram of an example of non-limiting lexicon transforming system that can transform a lexicon that describes an information asset, in accordance with one or more embodiments described herein.

FIG. 4 illustrates a block diagram of an example 400 of non-limiting lexicon transforming system 402 that can transform a lexicon that describes an information asset, in accordance with one or more embodiments described herein. Repetitive description of like elements and processes employed in respective embodiments is omitted for sake of brevity. As depicted, example 400 can include lexicon transforming system 402 coupled to information assets 165 and input device 180, via network 190. In one or more embodiments, lexicon transforming system 402 can include term validation component 110, lexicon transforming component 120, expert selecting component 310, term submitting component 320, keyword identifying component 410, candidate term selecting component 420, and any other components that can be used to enable different functions described herein.

As noted above, one approach to selecting candidate terms 220 for validation is to utilize lexicon expansion 260. An additional approach can utilize keyword identifying component 410 that can identify, by employing distributional semantics, a salient keyword describing information asset 165 based on factors including, but not limited to, an analysis of textual content describing the information asset. In different embodiments, utilizing distributional semantics can include processes that include, but are not limited to, selecting a source related to the informational asset, identifying patterns of terms related to the information asset and selecting terms based on the semantic relationships identified. In a simple example, for an asset that includes an omelet, recipes for omelets could be identified as a source, with phrases having particular verb and noun patterns, e.g., "heat the oil," "slice the onions," "add the eggs," and "fry the mushrooms." From this analysis, identified keywords can include oil, onions, eggs, and mushrooms. Once identified by keyword identifying component 410, candidate term selecting component 420 can select the salient keyword as one of candidate terms 220. For example, different approaches to evaluating the descriptiveness of keywords can be applied by term selecting component 420, including assessing the frequency of the term in sources related to the informational asset Returning to lexicon transforming component 120, in another function of one or more embodiments, in some circumstances, when lexicon 108 is transformed, an ontology alignment process can be performed. In some implementations, ontology alignment can assess the similarity of lexicon terms for information asset 165, and when similarity between terms deviates more than a threshold level, in some circumstances, terms can be removed from the lexicon.

Figure 5:
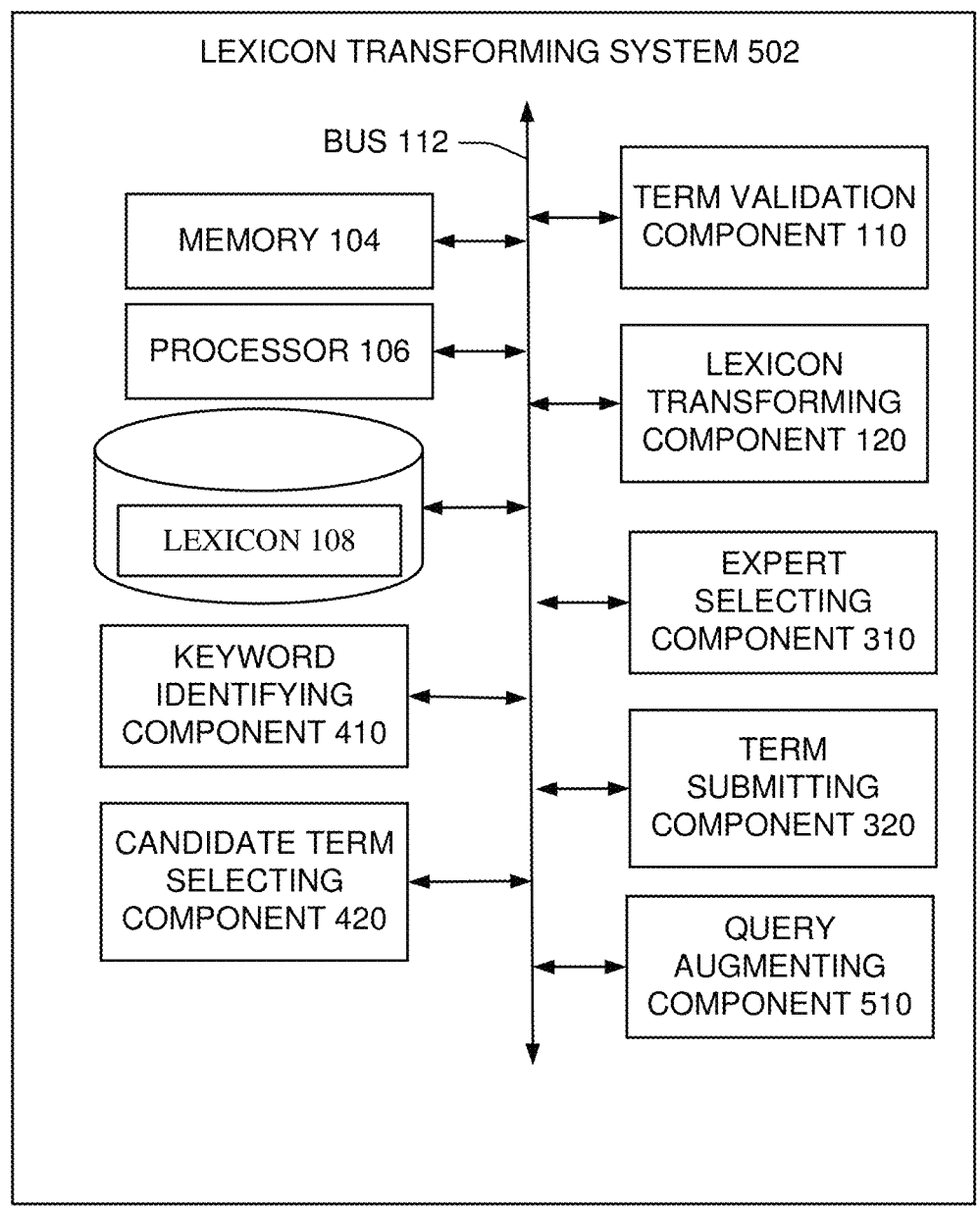
FIG. 5 illustrates a block diagram of an example of non-limiting lexicon transforming system that can transform a lexicon that describes an information asset, in accordance with one or more embodiments described herein.

FIG. 5 illustrates a block diagram of an example 500 of non-limiting lexicon transforming system 502 that can transform a lexicon that describes an information asset, in accordance with one or more embodiments described herein. Repetitive description of like elements and processes employed in respective embodiments is omitted for sake of brevity. As depicted, example 500 can include lexicon transforming system 502 coupled to information assets 165 and input device 180, via network 190. In one or more embodiments, lexicon transforming system 402 can include term validation component 110, lexicon transforming component 120, expert selecting component 310, term submitting component 320, keyword identifying component 410, candidate term selecting component 420, query augmenting component 510, and any other components that can be used to enable different functions described herein.

As described above, one or more approaches can use lexicon expansion 260 and micro-adjudication 215 by subject matter experts 210 to identify valid terms for describing information asset 165. In one or more additional embodiments, these components and processes can be used to augment queries for information assets, e.g., stored in a knowledge base. By generating keywords (e.g., with keyword identifying component 410), utilizing feedback from subject matter experts 210, and identifying similar terms in available lexicons, searches can be more likely to identify useful information assets.

In one or more embodiments, the query augmentation process can be performed by query augmenting component 510 that can augment a query of a knowledge base of information assets by employing validated term of a lexicon.

In one or more additional embodiments, in a function related to queries, for some queries of information assets, health scores lexicons can be updated to reflect different attributes of the lexicon and the information assets. Different factors that can be used to generate and periodically update health scores include, but are not limited to, freshness of the lexicon, popularity of the asset, the variety of the terms of the lexicon as compared to other lexicons, numbers and qualifications of contributors to the lexicon, and the size of the lexicon.

Generally speaking, in one or more embodiments, the health-score is a linear combination of the single indicators, each weighted by a scalar factor. In variations to this approach, weights and thresholds can be applied to different factors, e.g., to reflect the relevance of the factor.

Figure 6:
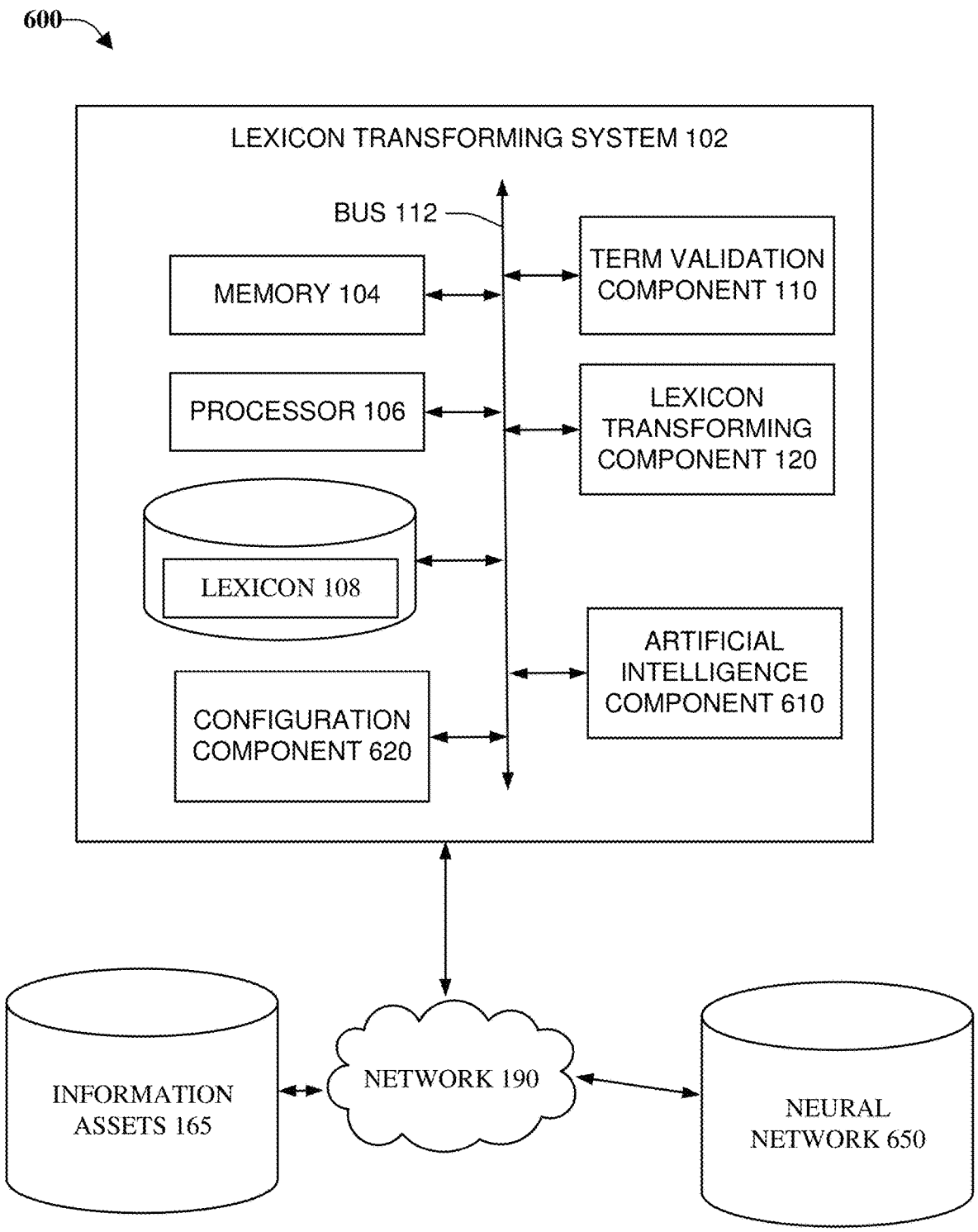
FIG. 6 illustrates a block diagram of an example of non-limiting lexicon transforming system that can employ artificial intelligence and machine learning to transform a lexicon that describes an information asset, in accordance with one or more embodiments described herein.

FIG. 6 illustrates a block diagram of an example 600 of non-limiting lexicon transforming system 602 that can employ artificial intelligence and machine learning to transform a lexicon that describes an information asset, in accordance with one or more embodiments described herein. Repetitive description of like elements and processes employed in respective embodiments is omitted for sake of brevity. As depicted, example 600 can include lexicon transforming system 502 coupled to information assets 165 and input device 180, via network 190. In one or more embodiments, lexicon transforming system 402 can include term validation component 110, lexicon transforming component 120, expert selecting component 310, term submitting component 320, keyword identifying component 410, candidate term selecting component 420, query augmenting component 510, artificial intelligence component 610, configuration component 620, and any other components that can be used to enable different functions described herein.

Some embodiments of artificial intelligence component 610 can generate classifications, correlations, inferences and/or expressions associated with principles of artificial intelligence. For instance, system components can employ an automatic classification system and/or an automatic classification process to determine candidate terms 220. In one example, candidate term selection component 420 can employ a probabilistic and/or statistical-based analysis (e.g., factoring into the analysis utilities and costs) to learn and/or generate inferences with respect to candidate terms 220.

In one or more embodiments, configuration component 620 can configure neural network 650 for different system functions, e.g., updating lexicon 108 based on candidate terms 220 and subject matter experts 210. In another function that can be performed by neural network 650, configuration component 610 can be used to assess semantic distances between aspects of subject matter experts and information assets.

One or more embodiments can employ any suitable machine-learning based techniques, statistical-based techniques and/or probabilistic-based techniques. For example, one or more embodiments can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. For example, one or more embodiments can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

It is to be appreciated that one or more embodiments described herein (e.g., validation component 110, lexicon transforming component 120, expert selecting component 310, term submitting component 320, keyword identifying component 410, candidate term selecting component 420, query augmenting component 510, as well as other system components) perform functions that cannot be performed by a human (e.g., is greater than the capability of a single human mind). For example, an amount of data processed, a speed of data processed and/or data types of data processed by the system 100 over a certain period of time can be greater, faster, and different than an amount, speed, and data type that can be processed by a single human mind over the same period of time. One or more embodiments can also be fully operational towards performing one or more other functions (e.g., fully powered on, fully executed, etc.) while also performing the above-referenced functions and processes, e.g., including information that can be impossible to obtain manually by a user.

Figure 7:
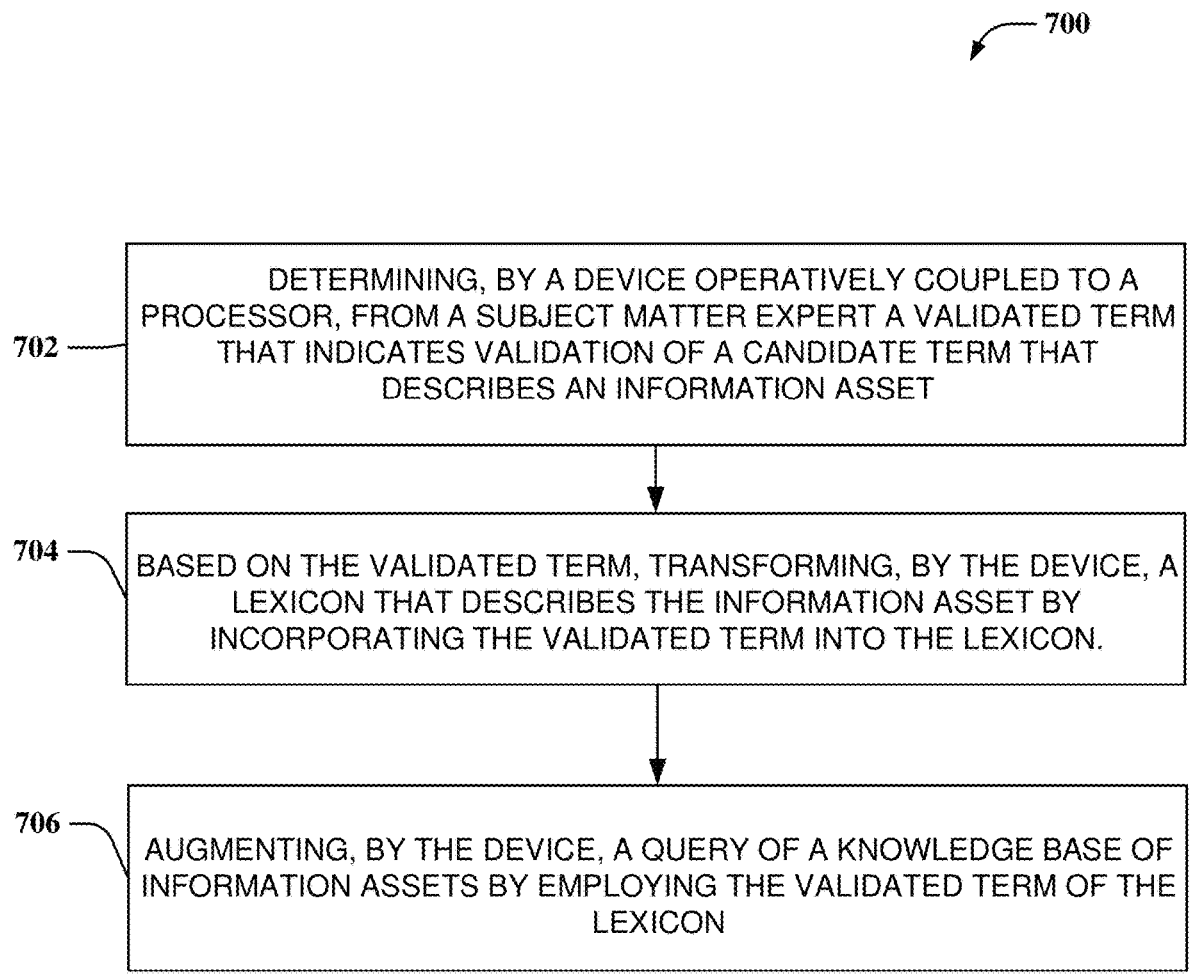
FIG. 7 illustrates a flow diagram of an example, non-limiting computer-implemented method that can transform a lexicon that describes an information asset, in accordance with one or more embodiments described herein.

FIG. 7 illustrates a flow diagram of an example, non-limiting computer-implemented method 700 that can transform a lexicon that describes an information asset (e.g., via lexicon transforming system 102), in accordance with one or more embodiments described herein. Repetitive description of like elements and processes employed in respective embodiments is omitted for sake of brevity.

At 702, computer-implemented method 700 can comprise determining, by a device operatively coupled to a processor, from a subject matter expert a validated term that indicates validation of a candidate term that describes an information asset. For example, in one or more embodiments, computer-implemented method 700 can include determining lexicon transforming system 320 via processor 106, from subject matter expert 210 (e.g., selected via expert selecting component 310) validated term 225 that indicates the validation (e.g., via term validation component 110) of candidate term 220 that describes information asset 165.

At 704, computer-implemented method 700 can comprise, based on the validated term, transforming, by the device, a lexicon that describes the information asset by incorporating the validated term into the lexicon. For example, in one or more embodiments, computer-implemented method 700 can include, based on validated term 225, transforming by lexicon transforming system 320, lexicon 108 (e.g., via lexicon transforming component 120) that describes the information asset 165 by incorporating validated term 225 into lexicon 108.

In an additional embodiment, at 706, computer-implemented method 700 can comprise augmenting, by the device, a query of a knowledge base of information assets by employing the validated term of the lexicon. For example, in one or more embodiments, computer-implemented method 700 can include augmenting (e.g., via term submitting component 320), a query (e.g., submitted via input device 180) of a knowledge base of information assets 165 by employing validated term 225 of the lexicon 108.

At least in practical implementations, at scale, lexicon transforming system 102 can employ combinations of hardware and software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Lexicon transforming system 102 and/or components thereof, can be employed to solve new problems that arise through advancements in technologies mentioned above, employment of quantum computing systems, cloud computing systems, computer architecture, and/or another technology.

It is to be appreciated that, in one or more embodiments, lexicon transforming system 102 can utilize various combinations of electrical components, mechanical components, and circuitry that cannot be replicated in the mind of a human or performed by a human. As would be understood by one having skill in the relevant art(s), given the description herein, for practical implementations at scale the various operations that can be executed by lexicon transforming system 102 and components thereof, are greater than the capability of a human mind. For instance, the amount of data processed, the speed of processing such data, or the types of data processed by lexicon transforming system 102 over a certain period of time can be greater, faster, or different than the amount, speed, or data type that can be processed by a human mind over the same period of time.

According to several embodiments, lexicon transforming system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that lexicon transforming system 102 can include information that is impossible to obtain manually by an entity, such as a human user. For example, the type, amount, and/or variety of information included in lexicon transforming system 102, lexicon transforming component 120, and term validation component 110 can be more complex than information obtained manually by a human user.

For simplicity of explanation, the computer-implemented methodologies are depicted and described as a series of acts. It is to be understood and appreciated that the subject innovation is not limited by the acts illustrated and by the order of acts, for example acts can occur in various orders and concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Lexicon transforming system 102 can comprise one or more computer and machine readable, writable, and executable components and instructions that, when executed by processor 106 (e.g., a classical processor, a quantum processor, etc.), can perform operations defined by such components and instructions. Further, in numerous embodiments, any component associated with lexicon transforming system 102, as described herein with or without reference to the various figures of the one or more embodiments described herein, can comprise one or more computer and machine readable, writable, and executable components and instructions that, when executed by processor 106, can perform operations defined by such components and instructions. For example, lexicon transforming component 120, term validation component 110, and any other components associated with lexicon transforming system 102 as disclosed herein (e.g., communicatively, electronically, operatively, and optically coupled with and employed by lexicon transforming system 102), can comprise such computer and machine readable, writable, and executable components and instructions. Consequently, according to numerous embodiments, lexicon transforming system 102 and any components associated therewith as disclosed herein, can employ processor 106 to execute such computer and machine readable, writable, and executable components and instructions to perform one or more operations described herein with reference to lexicon transforming system 102 and any such components associated therewith.

It should be noted that lexicon transforming system 102 can be associated with a cloud computing environment. For example, lexicon transforming system 102 can be associated with cloud computing environment 950 described below with reference to FIG. 9 and one or more functional abstraction layers described below with reference to FIG. 10 (e.g., hardware and software layer 1060, virtualization layer 1070, management layer 1080, and workloads layer 1090).

Lexicon transforming system 102 and components thereof (e.g., lexicon transforming component 120, term validation component 110, etc.) can employ one or more computing resources of cloud computing environment 950 described below with reference to FIG. 9 and one or more functional abstraction layers (e.g., quantum software, etc.) described below with reference to FIG. 10 to execute one or more operations in accordance with one or more of the embodiments described herein. For example, cloud computing environment 950 and such one or more functional abstraction layers can comprise one or more classical computing devices (e.g., classical computer, classical processor, virtual machine, server, etc.), quantum hardware, and quantum software (e.g., quantum computing device, quantum computer, quantum processor, quantum circuit simulation software, superconducting circuit, etc.) that can be employed by lexicon transforming system 102 and components thereof to execute one or more operations in accordance with one or more of the embodiments described herein.

Figure 8:
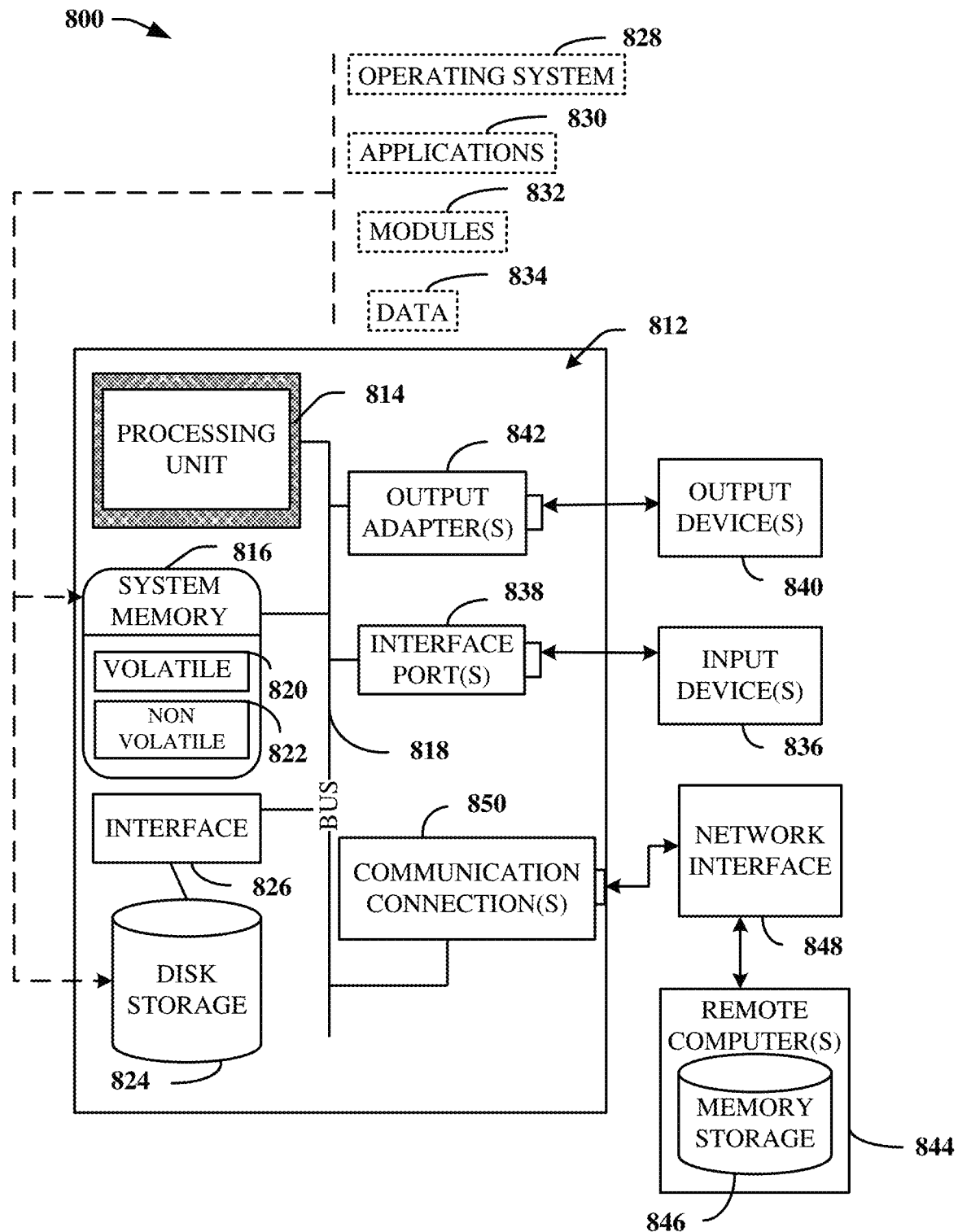
FIG. 8 illustrates a block diagram of an example, non-limiting operating environment in which one or more embodiments described herein can be implemented.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-80 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, a joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
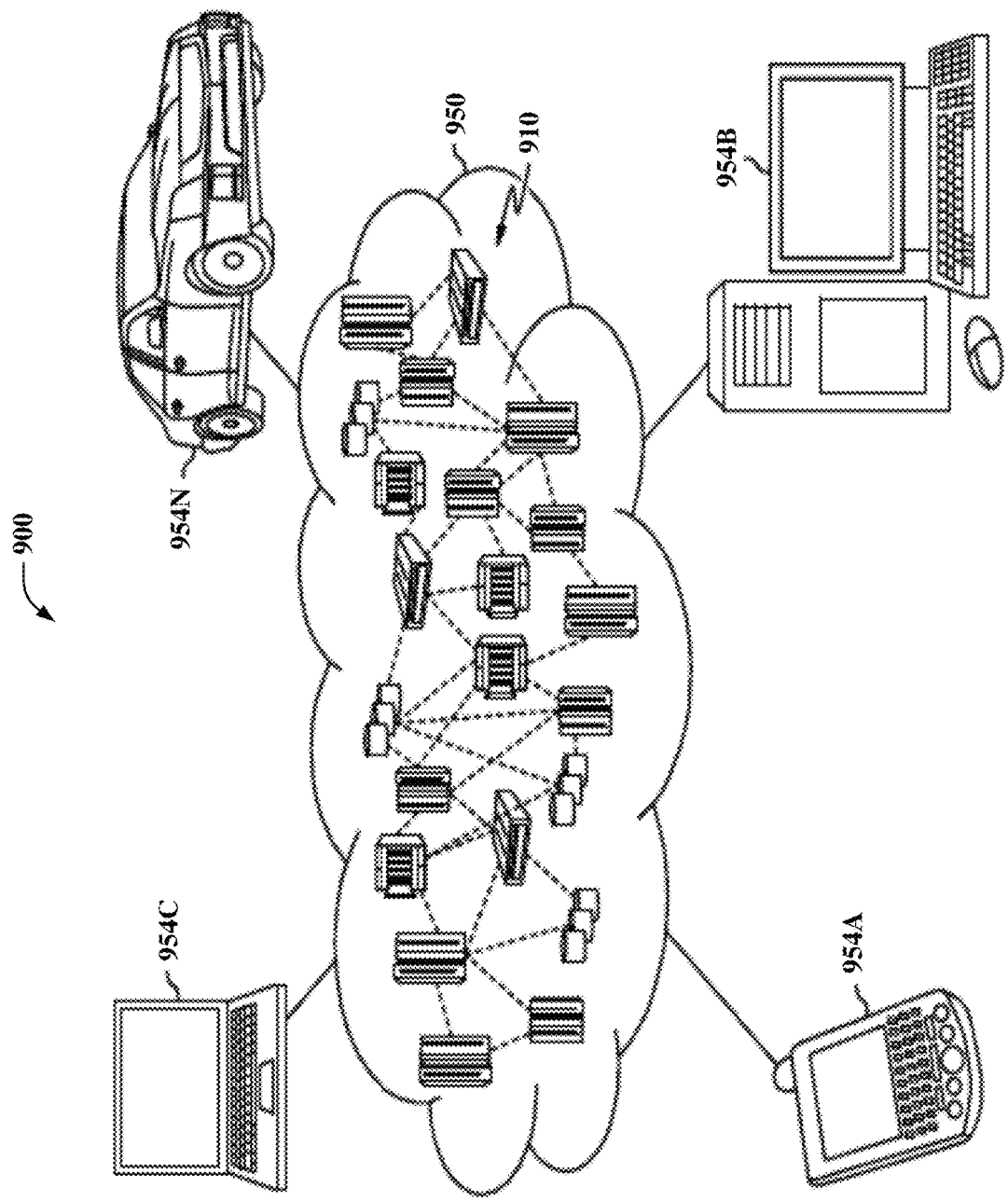
FIG. 9 illustrates a block diagram of an example, non-limiting cloud computing environment in accordance with one or more embodiments described herein.

Referring now to FIG. 9, an illustrative cloud computing environment 950 is depicted. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and network addressable connection (e.g., using a web browser).

Figure 10:
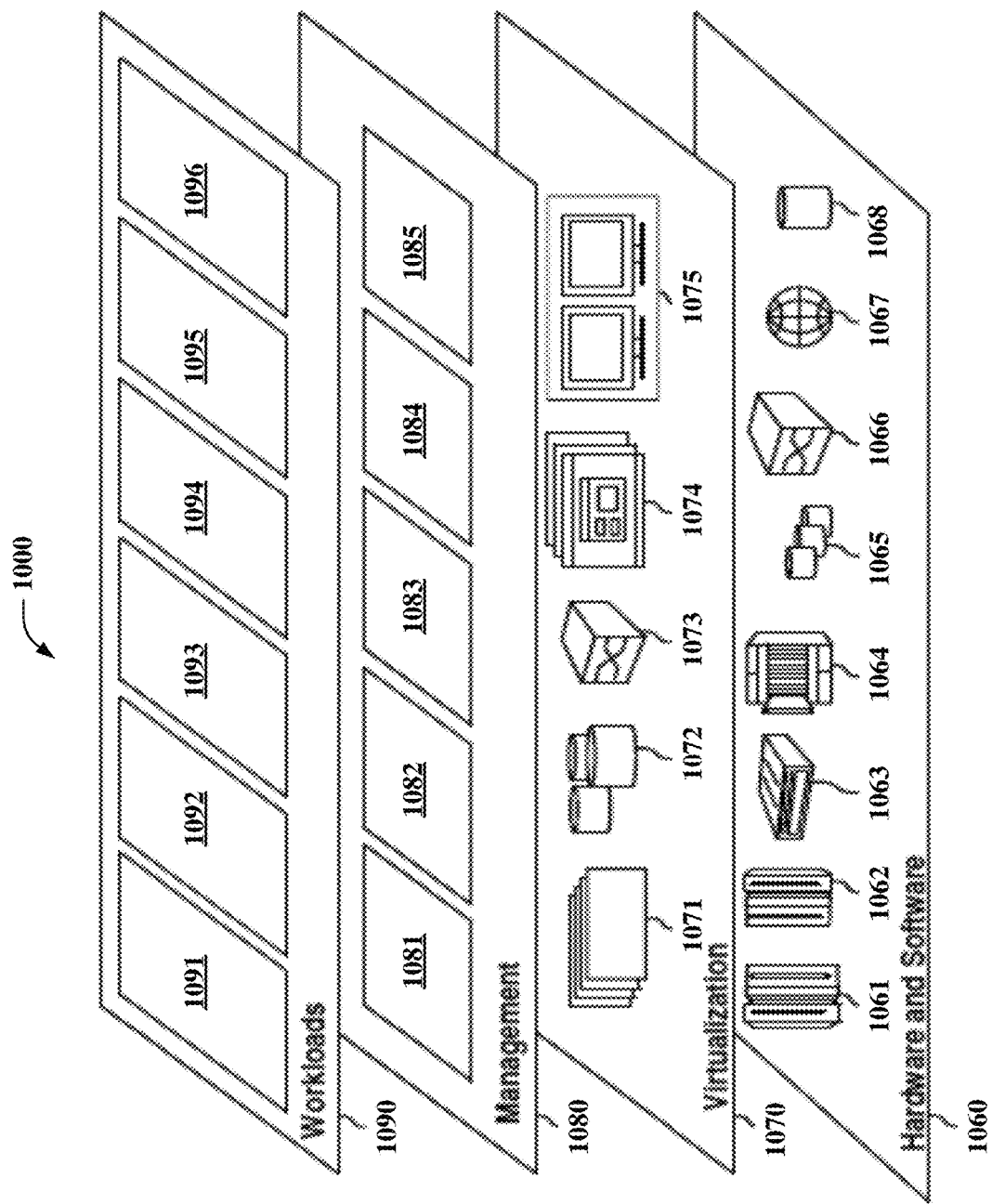
FIG. 10 illustrates a block diagram of example, non-limiting abstraction model layers in accordance with one or more embodiments described herein.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and quantum state measurement logic software 1096.

The present invention may be a system, a computer-implemented method, an apparatus and a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and a wireless network. The network can comprise copper transmission cables, optical transmission fibers, wireless transmission, routers, firewalls, switches, gateway computers and edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and block diagrams of computer-implemented methods, apparatus (systems), and computer program products according to embodiments of the invention. It will be understood that each block of the flowchart illustrations and block diagrams, and combinations of blocks in the flowchart illustrations and block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, computer-implemented methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and computers, those skilled in the art will recognize that this disclosure also can or can be implemented in combination with other program modules. Generally, program modules include routines, programs, components, data structures, etc. that perform particular tasks and implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process and thread of execution and a component can be localized on one computer and distributed between two or more computers. In another example, respective components can execute from various computer readable media having various data structures stored thereon. The components can communicate via local and remote processes such as in accordance with a signal having one or more data packets (e.g., data from one component interacting with another component in a local system, distributed system, and across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and "exemplary" are utilized to mean serving as an example, instance, or illustration. For the avoidance of doubt, the subject matter disclosed herein is not limited by such examples. In addition, any aspect or design described herein as an "example" and "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable components; and
   a processor that executes the computer executable components stored in the memory, wherein the computer executable components comprise:
   an expert selecting component that employs a neural network to:
      analyzes a lexicon that describes the information asset to determine a subject matter of the information asset, and based on the subject matter, selects a subject matter expert from a group of subject matter experts;
a candidate term selecting component that selects, using the neural network, based on the subject matter, a candidate term from a knowledge repository to augment the lexicon;
a term submitting component that submits the candidate term to the subject matter expert to validate the candidate term;
a term validation component that determines, based on a response from the subject matter expert, a validated term that indicates validation of the candidate term as being descriptive of the information asset; and
a lexicon transforming component that transforms, using the neural network, the lexicon that describes the information asset by incorporating the validated term into the lexicon.

2. The system of claim 1, wherein the computer executable components further comprise:
a query augmenting component that augments a query of a knowledge base of information assets by employing the validated term of the lexicon.

3. The system of claim 1, wherein the expert selecting component selects the subject matter expert based further on a relationship between the subject matter expert and the information asset.

4. The system of claim 3, wherein the relationship comprises the subject matter expert being an owner of the information asset.

5. The system of claim 1, wherein the expert selecting component selects the subject matter expert based further on:
determining that the subject matter expert has expertise regarding the information asset that exceeds a threshold.

6. The system of claim 1, wherein the computer executable components further comprise:
a configuration component that configures the neural network based on an analysis of a group of information assets.

7. The system of claim 1, wherein the computer executable components further comprise:
a keyword identifying component that identifies, by employing distributional semantics, a salient keyword describing the information asset based on an analysis of textual content describing the information asset; and
wherein the candidate term selecting component selects the salient keyword as the candidate term.

8. A computer-implemented method comprising:
analyzing, by a device operatively coupled to a processor, using a neural network, a lexicon that describes the information asset to determine a subject matter of the information asset;
selecting, by the device, using the neural network, based on the subject matter:
a subject matter expert from a group of subject matter experts, and
a candidate term from a knowledge repository to augment the lexicon;
submitting, by the device, the candidate term to the subject matter expert to validate the candidate term;
determining, by the device, based on a response from the subject matter expert, a validated term that indicates validation of the candidate term as being descriptive of the information asset; and
transforming, by the device, using the neural network, the lexicon that describes the information asset by incorporating the validated term into the lexicon.

9. The computer-implemented method of claim 8, further comprising:
augmenting, by the device, a query of a knowledge base of information assets by employing the validated term of the lexicon.

10. The computer-implemented method of claim 8, wherein the selecting the subject matter expert comprises selecting the subject matter expert based further on a relationship between the subject matter expert and the information asset.

11. The computer-implemented method of claim 10, wherein the relationship comprises the subject matter expert being an owner of the information asset.

12. The computer-implemented method of claim 8, wherein the selecting the subject matter expert comprises: determining that the subject matter expert has expertise regarding the information asset that exceeds a threshold.

13. The computer-implemented method of claim 8, further comprising:
configuring, by the device, the neural network based on an analysis of a group of information assets.

14. The computer-implemented method of claim 8, wherein the selecting the candidate term comprises:
identifying, using distributional semantics, a salient keyword describing the information asset based on an analysis of textual content describing the information asset; and
selecting the salient keyword as the candidate term.

15. A computer program product that transforms a lexicon that describes an information asset, the computer program product comprising a non-transitory computer readable storage medium having program instructions embodied therewith, the program instructions executable by a processor to cause the processor to:
analyze, using a neural network, a lexicon that describes the information asset to determine a subject matter of the information asset;
select, using the neural network, based on the subject matter:
a subject matter expert from a group of subject matter experts, and
a candidate term from a knowledge repository to augment the lexicon;
submit the candidate term to the subject matter expert to validate the candidate term;
determine, based on a response from the from a subject matter expert, a validated term that indicates validation of the candidate term as being descriptive of the information asset; and
transform, using the neural network, the lexicon that describes the information asset by incorporating the validated term into the lexicon.

16. The computer program product of claim 15, wherein the program instructions further cause the processor to augment a query of a knowledge base of information assets by employing the validated term of the lexicon.

17. The computer program product of claim 15, wherein the selecting the subject matter expert comprises selecting the subject matter expert based further on a relationship between the subject matter expert and the information asset.

18. The computer program product of claim 15, wherein the relationship comprises the subject matter expert being an owner of the information asset.

19. The computer program product of claim 15, wherein the selecting the subject matter expert comprises:
  determining that the subject matter expert has expertise regarding the information asset that exceeds a threshold.

20. The computer program product of claim 15, wherein the program instructions further cause the processor to configures the neural network based on an analysis of a group of information assets.

* * * * *